T. R. DENBY.
Land Pulverizers.

No. 137,764.

Patented April 15, 1873.

Witnesses.
C. C. Poole
C. L. Evert

Inventor.
Thomas R. Denby
By J. McC. Perkins
Atty.

UNITED STATES PATENT OFFICE.

THOMAS R. DENBY, OF CARLINVILLE, ILLINOIS.

IMPROVEMENT IN LAND-PULVERIZERS.

Specification forming part of Letters Patent No. 137,764, dated April 15, 1873; application filed February 3, 1873.

*To all whom it may concern:*

Be it known that I, THOMAS R. DENBY, of Carlinville, in the county of Macoupin and State of Illinois, have invented certain new and useful Improvements in Land-Pulverizers; and do hereby declare the following to be a full, clear, and exact description of the same, reference being had to the accompanying drawing and to the letters of reference marked thereon.

The nature of my invention consists in the construction and arrangement of a combined leveler, harrow, and roller, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
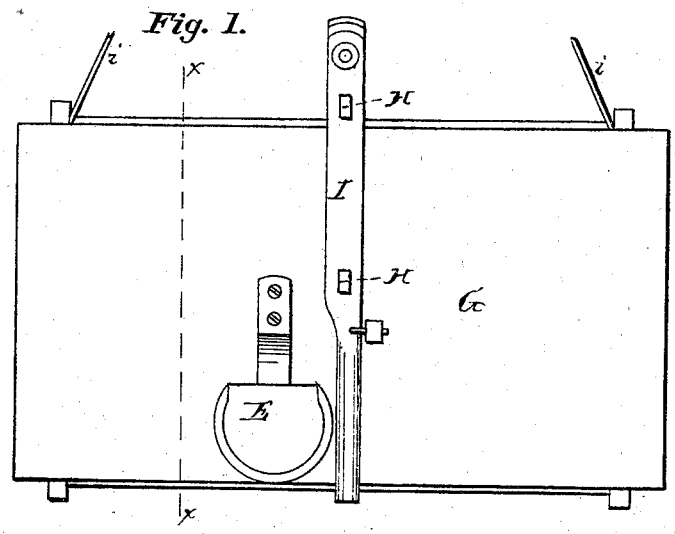
Figure 2:
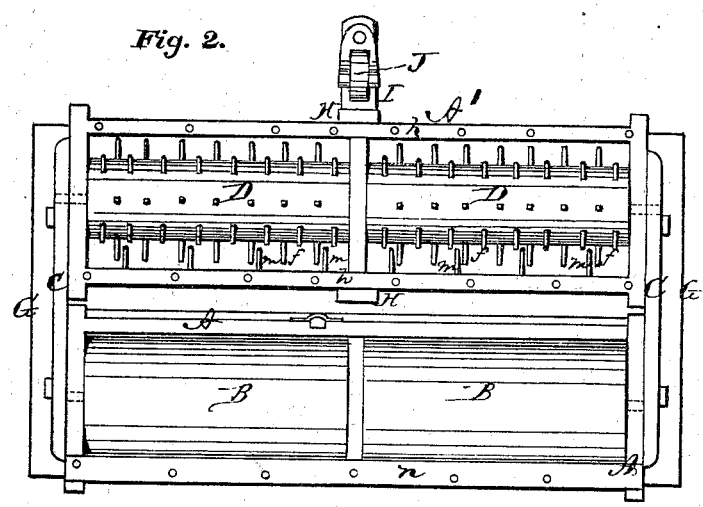
Figure 3:
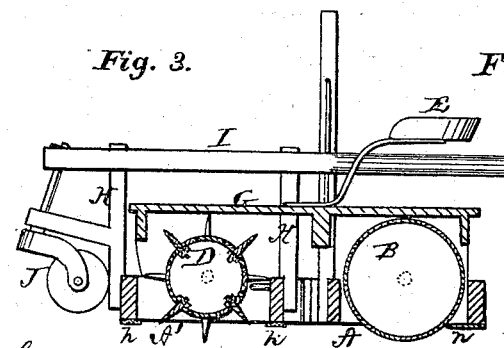
Figure 4:
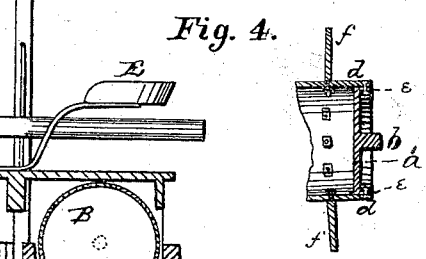

Figure 1 is a plan view, Fig. 2 a bottom view, and Fig. 3 a transverse vertical section through line $x$ $x$, Fig. 1, of my machine. Fig. 4 is a section of the harrow.

A represents a rectangular frame of suitable dimensions to receive within it the two rollers B B, placed end for end, as shown in Fig. 2. To the end pieces of the frame A are attached bars C C, which extend forward a suitable distance, and between the front ends of which is a similar frame, A', containing the harrow-cylinders D D, also placed end for end. The cylinders D D are constructed in the following manner: The heads $a$ of each cylinder are solid cast-iron, with wrought-iron pivots $b$ cast into the same. The heads $a$ have a flange, $e$, extending outwardly around them, about an inch and a half wide, and to the heads are secured the wooden sections $d$ by means of bolts inserted through the wood and the flange, so that all the sections may be readily removed at will. The sections $d$ are provided with teeth $f$, which are inclined on the rear side and fastened by nuts on the inside of the section. The teeth $f f$ are set in diamond shape, that is, the teeth of each row in the cylinder are opposite to the spaces between the teeth of the adjoining rows, thereby cutting up or spiking the clods instead of dragging them in another position, and being thus cut up by the teeth of the harrow are more effectually prepared to be crushed by the rollers. The pivot $b$ at the outer end of each cylinder D extends beyond its bearings in the frame A' and into suitable boxes on the side bars C C, and thus pivot the frame A' to said bars. The rollers B B are constructed in precisely the same manner as described for the harrow-cylinders D D, except, of course, that the wooden sections have no teeth. The frame A', in which the harrow-cylinders D D revolve, constitutes the leveler, the front part of the same running low enough to strike down all irregularities of the ground over which it passes. The under side of this leveler-frame is faced with iron, $h$, in front and rear of the harrow. G is a platform covering the harrow and rollers, supported upon the side pieces C C, and provided with a seat, E, for the driver. In the center of the leveler-frame A', both at the front and rear, is a bar, H, projecting upward, and to their upper ends is attached a lever, I. Through the front end of this lever passes the shank of a caster-wheel, J, which also passes through a projection on the front bar H. By raising the rear end of the lever I the wheel is lowered, raising the harrow and leveler-frame from the ground for the purpose of driving from field to field. The tongue or other pulling-gear is connected by rods $i$ $i$ to the front side of the swinging leveler-frame A'. In rear of the harrow-cylinders D D, to the frame A', are attached stationary teeth $m$ for cleaning the harrow of any obstruction. In rear of the rollers B B is a scraper, $n$, for cleaning the same.

Having thus fully described my invention, what I claim as new, and desire to secure by Letters Patent, is—

The arrangement of the oscillating iron-faced leveler-frame A', the harrow-cylinders D D, the lever I, bars H H, and rollers B B, as and for the purposes herein set forth.

In testimony that I claim the foregoing I have hereunto set my hand this 24th day of January, 1873.

THOMAS R. DENBY.

Witnesses:
 W. H. SNELLING,
 J. D. KERR.